US005170189A

United States Patent [19]

Masuda et al.

[11] Patent Number: 5,170,189

[45] Date of Patent: Dec. 8, 1992

[54] ELECTROSTATIC LATENT IMAGE FORMING DEVICE WITH INTEGRAL FEEDER TERMINAL CONNECTION

[75] Inventors: Koji Masuda; Yuji Suemitsu; Kazuo Asano; Akinori Komura, all of Kanagawa, Japan

[73] Assignee: Fuji Xerox Co., Ltd., Tokyo, Japan

[21] Appl. No.: 741,370

[22] Filed: Aug. 7, 1991

[30] Foreign Application Priority Data

Aug. 7, 1990 [JP] Japan ................................ 2-207568

[51] Int. Cl.[5] ........................................ G01D 15/06

[52] U.S. Cl. .................................... 346/159; 346/150

[58] Field of Search .................. 346/159, 155, 139 C, 346/150, 158, 155, 153.1; 400/119; 29/825; 355/219

[56] References Cited

U.S. PATENT DOCUMENTS 4,593,994 6/1986 Tamura et al. ................ 346/159 X
4,628,227 12/1986 Briere ............................ 315/111.81
4,675,703 6/1987 Fotland .............................. 346/159
4,679,060 7/1987 McCallum et al. ................. 346/159
4,918,468 4/1990 Miekka et al. ...................... 346/159
4,958,172 9/1990 McCallum et al. ................. 346/159
5,006,869 4/1991 Buchan et al. ...................... 346/159
5,025,552 6/1991 Yamaoka ............................. 29/825

*Primary Examiner*—A. T. Grimley
*Assistant Examiner*—T. A. Dang
*Attorney, Agent, or Firm*—Finnegan, Henderson, Farabow, Garrett and Dunner

[57] ABSTRACT

Electrostatic latent image forming device includes a first insulating base plate, a plurality of first electrodes and a plurality of second electrodes disposed to form a matrix with a second insulating base plate interposed therebetween. Each of the second electrodes has a space area where a creeping corona discharge is caused to occur by applying a voltage between the first and second electrodes. The second insulating base plate is supported by the first insulating base plate. In the electrostatic latent image forming device, through holes are formed in the first insulating base plate, and conductors in conduction to the first and second electrodes are filled into the through holes. Connecting parts in conduction to the conductors are provided on the back surface of the first insulating base plate to apply voltages to the first and second electrodes through the conductors.

8 Claims, 12 Drawing Sheets

ELECTROSTATIC LATENT IMAGE FORMING DEVICE WITH INTEGRAL FEEDER TERMINAL CONNECTION

BACKGROUND OF THE INVENTION

1. Field of the Invention

The present invention relates to a device for forming an electrostatic latent image for use in electrostatic recording and, in particular, to an electrostatic latent image forming device using ion stream control.

2. Description of the Related Art

Conventionally, there has been known an electrostatic latent image forming device of the above-mentioned type, which will be described below. As shown in FIG. 23, in the conventional electrostatic latent image forming device, drive electrode 101 are disposed on an insulating base plate 100 in such a manner that the drive electrodes are parallel to one another. Control electrode 104 are disposed above the drive electrodes through an insulating layer 102 in such a manner that the control electrodes 104 cross over the drive electrodes 101 respectively. The drive electrode 101 and the control electrodes 104 cooperate to form a matrix. Also, each of the control electrode 104 includes two long and narrow electrodes 105 and 105 disposed in parallel to each other, so as to form a space area 106 for generating ions. Further, a flat-plate shaped screen electrode 108 is disposed over the control electrodes 104 through an insulating layer 107. In the screen electrode 108, as shown in FIG. 24, there are formed circular openings 109 for leading ions only at the positions that correspond to the space areas 106 of the control electrodes 104. In this figure, reference numeral 110 designates an opening formed in the insulating layer 107.

The electrostatic latent image forming device applies a high-frequency high voltage across the drive electrodes and control electrode 104, an ion control voltage to the control electrode 104, and a d.c. voltage to the screen electrode 108, as shown in FIG. 24. As a result of this, a creeping corona discharge is generated in the space areas 106 between the drive electrode 101 and control electrode 104, to produce ions. The ions are then accelerated or absorbed by an electric field produced by the control and screen electrodes 104 and 108 to thereby control the release of ions, so that an electrostatic latent image can be formed.

Now, the electrostatic latent image forming device can be installed to a main body of an ion stream control recording device in the following manner. The electrostatic latent image forming device is installed in such a manner that the lower surface of the insulating base plate 100 having the drive electrode 101, control electrodes 104 and the like thereon rests on a holder mount 111, as shown in FIG. 25. The holder mount 111 is disposed on the upper portion of a dielectric drum 112 in such a manner that it is divided into two, namely, right and left sections, and includes an upper surface 111a which is formed in a horizontal surface. The lower surface of the insulating base plate 100 rests on the horizontally formed, upper surface 111a of the holder mount 111.

In the electrostatic latent image forming device, due to the fact that the surface of the insulating base plate 100 on which the drive electrodes 101, control electrodes 104 and the like are provided is located on the lower side of the insulating base plate 100, that is, on the side of the holder mount 111, a feeder terminal for applying a high voltage to the drive electrodes 101, control electrodes 104, and the like is disposed in a space S between the holder mount 111 and dielectric drum 112.

However, the conventional electrostatic latent image forming device has the following problems. The space S formed between the holder mount 111 and dielectric drum 112 is small and thus the feeder terminal for feeding electricity to the drive electrodes 101, control electrodes 104, and the like must be be small enough to fit within the small space S. As such, it is difficult to provide and mount the feeder terminal in the small space S. Also, because the feeder terminal must be provided in the small space S between the holder mount 111 and dielectric drum 112, it is difficult to obtain a positive contact between the feeder terminal and the feeding part of the electrode. It is also hard to provide a positive connection of a necessary high voltage input. Likewise, since the feeder terminal and other components can come near or contact each other, or the feeder terminal can incur a poor contact, there is a possibility that leakage, attenuation or abnormal discharge may occur in the feeder terminal and other components.

In order to solve the above-mentioned problems, some measures can be taken. Specifically, as shown in FIG. 26, the end portions of the drive electrodes 101 and control electrodes 104 may be extended along the surface of the insulating base plate 100 and in the width direction of the base plate 100, and the lower surfaces of the extended portions 101' and 104' of the drive electrodes 101, and control electrodes 104 may be supported by an insulating frame member 113. Further, the portion of the insulating base plate 100 on which the insulating frame member 113 is put may be placed on the holder mount 111, and contact probes 114 may be pressed against the extended portions 101' and 104' of the drive electrodes 101 and control electrodes 104 from above, thereby providing connection of a high voltage input.

In this case, however, the drive electrodes 101 and control electrodes 104 must be extended to provide the extended portions 101', and 104', and also these extended portions 101' and 104' must be supported by the insulating frame member 113, with the result that the electrostatic latent image forming device is complicated in structure and increased in size. As a result, the whole device becomes large-sized and the cost of the device increases.

SUMMARY OF THE INVENTION

The present invention aims at eliminating the drawbacks found in the above-mentioned conventional electrostatic latent image forming device.

Accordingly, it is an object of the invention to provide an electrostatic latent image forming device which permits easy provision of a feeder terminal and the like for applying a voltage to an electrode and easy and positive connection of a high voltage input. It is a further object of the invention to provide an electrostatic latent image forming device which prevents occurrence of leakage, attenuation or abnormal discharge in the feeder terminal and the like, and permits a simple and compact structure.

An electrostatic latent image forming device according to the invention includes a first insulating base plate, a plurality of first electrodes, a plurality of second electrodes and a second insulating base plate, in which the first and second electrodes are disposed to form a matrix with the second insulating base plate interposed therebetween. Each of the second electrodes has a space area where a creeping corona discharge is caused to occur by applying a voltage across the first and second electrodes, and the second insulating base plate is supported by the first insulating base plate. The electrostatic latent image forming device is characterized by forming through holes in the first insulating base plate, the through holes extending through the first insulating base plate up to a back surface thereof. Conductors are filled into the through holes, the conductors being in conduction to the first and second electrodes, and connecting parts are provided on the back surface of the first insulating base plate. Preferably, the connecting parts are in conduction to the conductors, whereby to apply voltages to the first and second electrodes through the connecting parts.

Preferably, the first and second insulating base plates are formed of a ceramic material such as alumina, zirconia or the like. Further, the material of the first and second insulating base plates is not limited to the ceramic material mentioned above, but other materials such as natural mica, synthetic resin and the like may also be used to form the base plates.

Also, the first and second electrodes may be formed of a sintered metal conductor material such as tungsten (W), molybdenum (Mo), tungsten manganese (W·Mn), molybdenum manganese (Mo·Mn) or the like.

BRIEF DESCRIPTION OF THE DRAWINGS

The exact nature of this invention, as well as other objects, features and advantages thereof, will be readily apparent from consideration of the following specification relating to the accompanying drawings, in which like reference characters designate the same or similar parts throughout the figures thereof and wherein.

DETAILED DESCRIPTION OF THE PREFERRED EMBODIMENTS

Detailed description will hereunder be given of the preferred embodiments of an electrostatic latent image forming device according to the present invention with reference to the accompanying drawings.

FIRST EMBODIMENT

Figure 1:
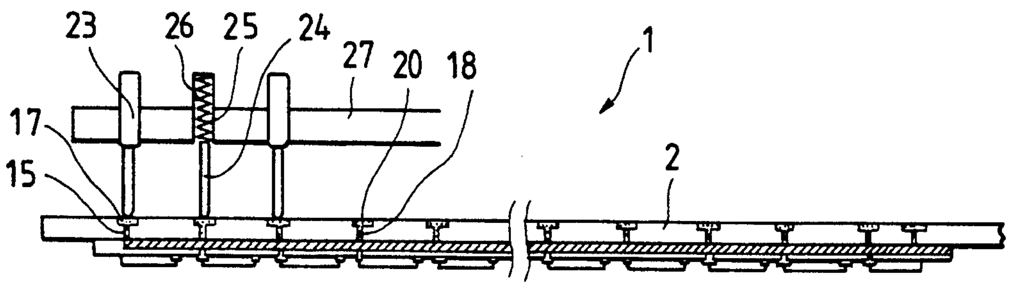
FIG. 1 is a section view of a recording head showing a first embodiment of the electrostatic latent image forming device according to the invention.
Figure 2:
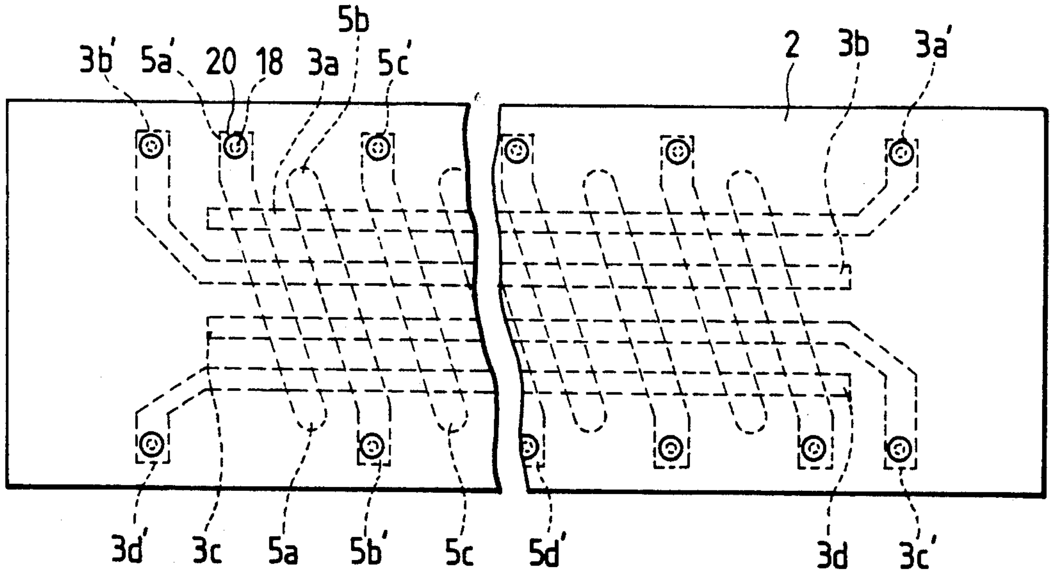
FIG. 2 is a rear view of the recording head shown in FIG. 1.

Referring first to FIGS. 1 through 10, there is shown a first embodiment of an electrostatic latent image forming device according to the invention. In these figures, reference numeral 1 designates a recording head which is an electrostatic latent image forming device and the head includes an insulating base plate 2 serving as a first insulating base plate. The insulating base plate 2 is formed in a rectangular shape with a front and back surface, and is made of ceramic material such as alumina or the like. The insulating base plate 2 includes on the front surface thereof a plurality of drive electrodes 3*a*, 3*b*, 3*c*, hereinafter collectively referred to by reference character 3, as first electrodes extending in parallel to one another along the longitudinal direction of the insulating base plate. The ends of the drive electrodes 3 are respectively bent in a substantially L-like shape toward the ends of the insulating base plate 2 in the transverse direction thereof, to form end portions 3*a*', 3*b*', 3*c*', hereinafter collectively referred to by reference character 3', as shown in FIG. 2.

The above-mentioned drive electrodes 3 can be formed by pattern printing a metal such as tungsten or the like on the insulating base plate using a screen printing method or similar methods. The thickness of each of the drive electrodes 3 is set within the range of 5–40 μm; but preferably between 10 and 20 μm. The distance between the mutually adjoining drive electrodes is set within the range of 100–500 μm; but preferably between 200 and 400 μm.

Figure 3:
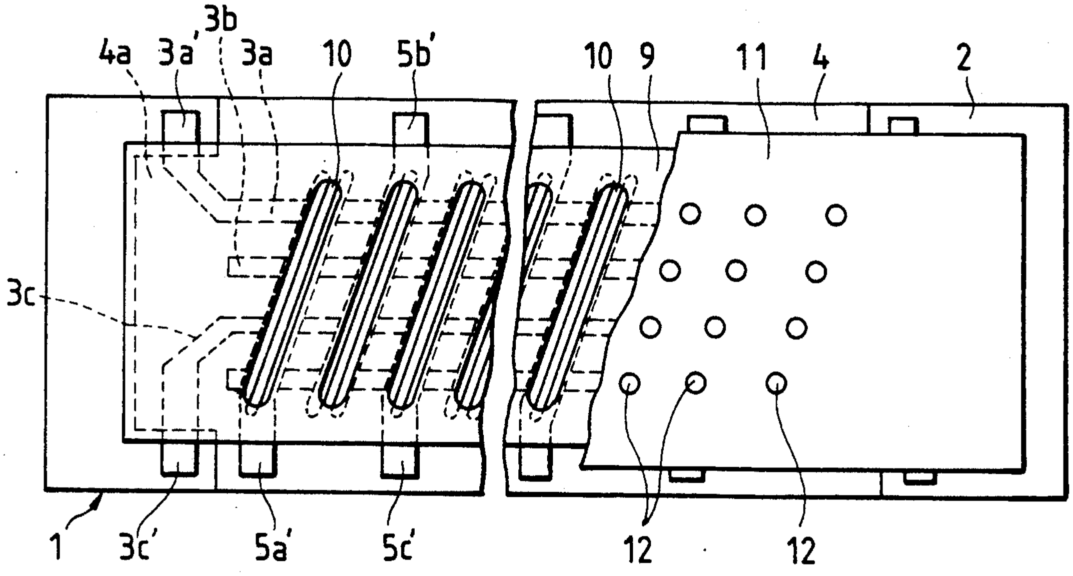
FIG. 3 is a partially cutaway front view of the recording head shown in FIG. 1.
Figure 6:
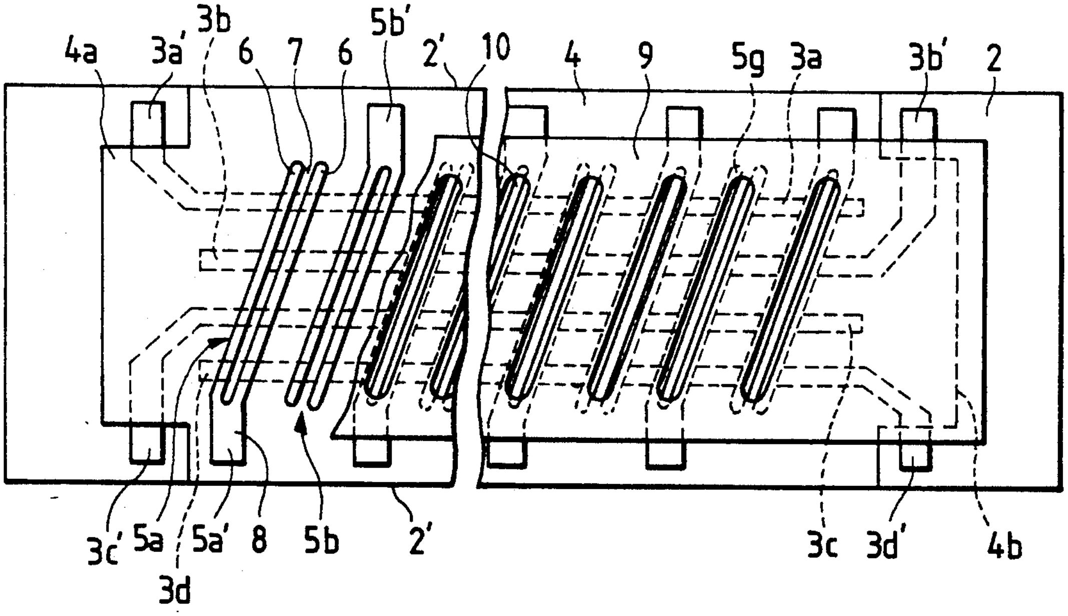
FIG. 6 is a different partially cutaway front view of the recording head.

On the drive electrodes 3, as shown in FIG. 3, there is placed an insulating layer 4 composed of a green sheet which is formed of ceramics such as alumina or the like, and the insulating layer serves as a second insulating base plate. The thickness of the insulating layer 4 is set within the range of 10–50 μm; but preferably between 20 and 30 μm. The insulating layer 4 is equal in width to the insulating base plate 2, and is shorter in length than the insulating base plate 2, as shown in FIG. 6. Further, the longitudinal ends 4*a* and 4*b* of the insulating layer 4 are constructed in a substantially convex shape so that they can cover the entire surfaces of the drive electrodes 3', except for the ends 3' of the drive electrodes 3.

On the above-mentioned insulting layer 4, there are provided a plurality of control electrodes 5*a*, 5*b*, 5*c*, hereinafter collectively referred to by reference character 5, serving as second electrodes in such a manner that they cross over the drive electrodes 3 at a predetermined angle to provide a matrix. The points of intersection of the drive electrodes 3 and the control electrodes 5, also known as, the discharge generating positions, are set in such a manner that they are arranged at a predetermined density, i.e. 240 dots per inch, along the longitudinal direction of the recording head 1.

The control electrodes 5 may be formed by pattern printing a metal such as tungsten or the like using a screen printing method or similar methods. The thickness of each of the control electrodes 5 is set within the range of 5–40 μm; but preferably between 10 and 20 μm, similarly as in the drive electrodes. Each of the control electrodes 5—has two narrow electrodes 6 disposed in parallel to each other and a space area 7 formed between the two electrodes 6 for generating ions. Further, a connecting end portion connects the two electrodes 6 to each other in a U shape, so that each of the control electrodes is formed substantially in a fork shape. Also, the U-shaped connecting end portions 8, of adjacent control electrodes 5 are disposed alternately on the opposite sides in the width direction of the insulating base plate 2, as seen in FIG. 3. Furthermore, the ends 5*a'*, 5*b'*, 5*c'*, hereinafter collectively referred to by reference character 5', of the control electrodes 5 are spaced from the width-direction edges 2' of the insulating base plate 2 by a predetermined distance.

Figure 5:
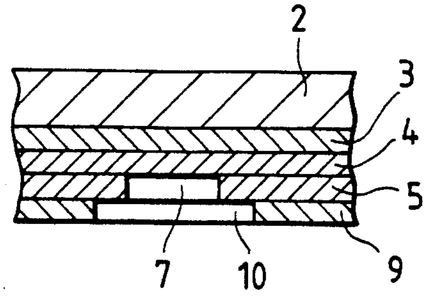
FIG. 5 is a section view of a portion of the recording head.

On the control electrodes 5, as shown in FIG. 5 as well, there is placed an insulating layer 9 which is a green sheet formed of ceramics such as alumina or the like. The insulating layer 9 is constructed using a screen printing method in such a manner that it is smaller in width and length than the insulating base plate 2. Also, in the portions of the insulating layer 9 corresponding to the space areas 7 of the control electrodes 5, there are formed a long and narrow, elliptic openings 10. The thickness of the insulating layer 9 is set within the range of 10–50 μm; but preferably between 20 and 30 μm.

Figure 4:
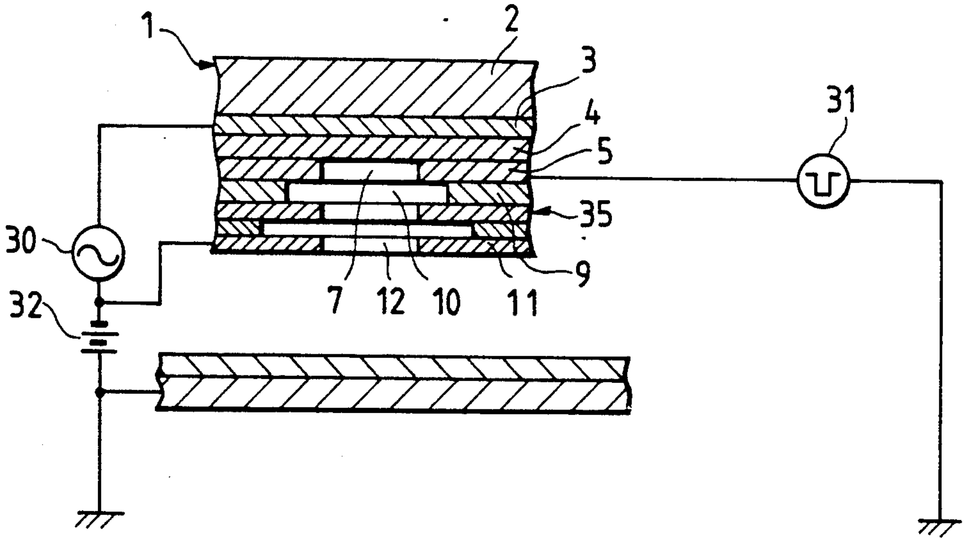
FIG. 4 is a section view to show how the recording head is used.

Further, on the surface of the insulating layer 9, as shown in FIGS. 3 and 4, there is disposed through spacer member 35 a screen electrode 11 which serves as a third electrode. The screen electrode 11 includes circular openings 12 for guiding out ions only at the positions thereof that correspond to the intersecting positions of the drive electrodes 3 and control electrodes 5, as shown in FIG. 3.

In accordance with the present invention, through holes respectively extending through the first insulating base plate up to the back surface thereof are formed in the first and second insulating base plates. Conductors in connection with the first and seconds electrodes are respectively loaded into the through holes. Connecting parts respectively in conduction with the conductors which are loaded into the through holes are formed in the back surface of the first insulating base plate. As such, a voltage can be applied to the first and second electrodes through the connecting parts.

As embodied herein, the end portions 3' of the drive electrodes 3 are respectively bent in a substantially L-like shape along the width direction of the insulating base plate 2, and, spaced by a predetermined distance from the edges 2' of the insulating base plate 2, as shown in FIG. 2.

Figure 7:
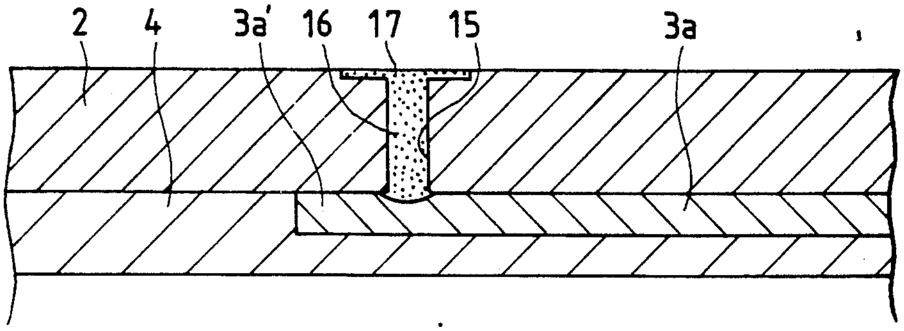
FIGS. 7 and 8 are alternate section views of main portions of the recording head.

In the insulating base plate 2, through holes 15 are formed at the positions thereof corresponding to the end portions 3' of the drive electrodes 3 in such a manner that they each extend through the insulating base plate 2 up to the back surface thereof, as shown in FIGS. 1 and 7. Conductors 16 formed of the same metal material as in the drive electrodes 3 are loaded into the through holes 16, respectively. Each conductor 16 has one end connected to the respective end portion 3' of a drive electrode 3, while the other end thereof is connected to a respective conductor pad 17. The conductor pads 17 serve as connecting parts formed on the back surface of the insulating base plate 2, respectively. Preferably, each of the conductor pads 17 has a circular shape.

The end portions 5' of the control electrodes 5 are extended along the width direction of the insulating base plate 2, as described before, also the end portions 5' of the control electrodes 5 are disposed internally, namely, spaced inwardly from the width-direction edges 2' of the insulating base plate, as shown in FIG. 2.

Figure 8:
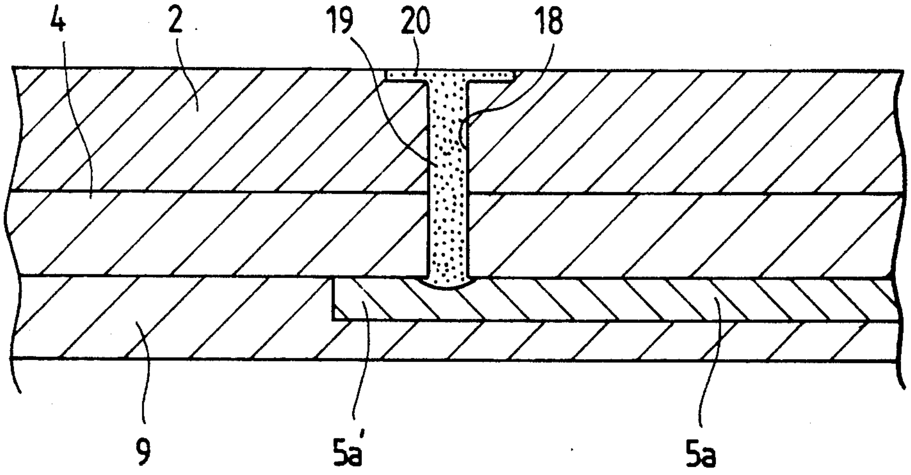

In the insulating base plate 2 and insulating layer 4, at the positions thereof corresponding to the end portions 5' of the control electrodes 5, through holes are formed such that they extend through the insulating layer 4 and insulating base plate 2 up to the back surface of the insulating base plate 2, as shown in FIGS. 1 and 8. Into these through holes 18 there are loaded conductors 19 which are respectively formed of the same metal material as in the control electrodes 5. One end of each conductor 19 is connected to the end portion 5' of a respective control electrode 5, while the other end thereof is connected to a conductor pad 20. The conductor pads 20 serve as connecting parts which are respectively formed in a circular shape on the back surface of the insulating base plate 2.

Figure 9:
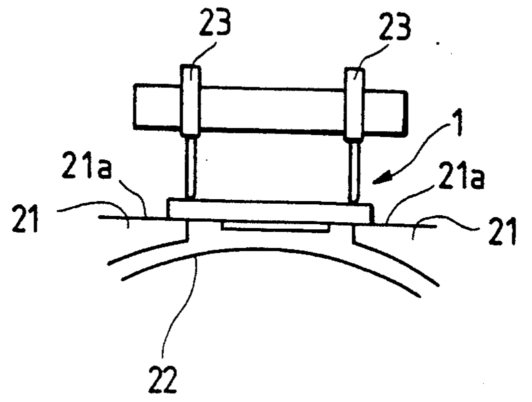
FIG. 9 is an explanatory side view representative of how the recording head is mounted.

The recording head 1 constructed in the above mentioned manner is mounted such that the upper surface of the insulating base plate 2 has thereon the drive electrodes 3 and the control electrodes 5*a*, 5*b*, 5*c*, faces while the lower surface of the insulating base plate 2 rests on a holder mount 21, as shown in FIG. 9. The holder mount includes two holder mount sections 21 which are disposed above a dielectric drum 22 at a given distance from each other. Each holder mount section 21 has an upper surface 21*a* which is formed horizontally.

Also, as shown in FIG. 1, contact probes 23 are pressed against the back surface of the recording head 1. By means of these contact probes 23, predetermined high voltages can be applied to the drive electrodes 3 and the control electrodes 5.

Figure 10:
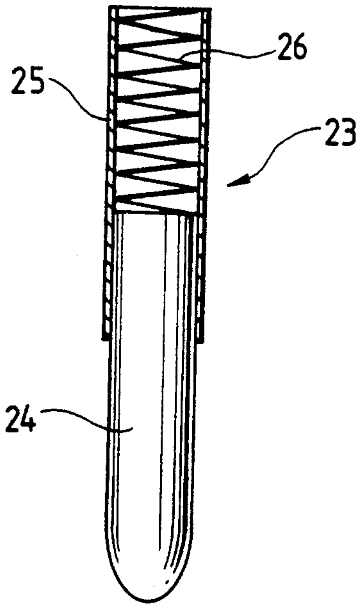
FIG. 10 is a section view of a contact probe.

Each of the contact probes 23 is composed of a pin 24, a sleeve 25 which stores the pin 24 in such a manner that the pin is free to advance or retract, and a spring 26 which biases the pin 24 in a direction for the pin to advance or project from the sleeve 25, as shown in FIG. 10. Also, these contact probes 23 are mounted to a base plate 27 disposed on the back surface of the recording head 1. More particularly, the contact probes are disposed at the positions along the base plate 27 which correspond to the conductor pads 17 and 20 provided on the back surface of the insulating base plate 2, as shown in FIG. 1. Further, the pin 24 is stored in the sleeve 25 in such a manner that the pin is kept from coming off.

The leading ends of the pins 24 of the contact probes 23 are pressed against the conductor pads 17 and 20 in turn the pins 24, are connected through the conductor pads 17 and 20, and conductors 16 and 19, to the drive electrodes 3 and control electrodes 5 - - - . Therefore, by applying given voltages to the contract probes 23, the drive electrodes 3 and control electrodes 5 can be electrically energized.

In the preferred embodiment, the recording head 1, which has the above mentioned structure, is manufactured in the following manner. The insulating base plate 2, for example, is formed from a green sheet made of 96% alumina and having a width of 40 mm, a length of 200 mm, and a thickness of 1 μm. This green sheet can be manufactured by adding a firing assistant ($SiO_2$, MgO, CaO or the like) to an alumina powder ($Al_2O_3$), and further by adding an organic binder necessary for formation, a plasticizer, a dispersant and the like. Further, the green sheet that forms the insulating base plate 2 can be manufactured in the form of the given sheet shape mentioned above, by a press method in which a green sheet material is pressed using a press machine, a roll method in which the green sheet material is pressed between a pair of rollers, a blade method in which the green sheet material is formed into a given shape using a blade, or other similar methods.

In thus formed green sheet, which is utilized as the insulating base plate 2 with a relatively greater thickness, at the positions thereof corresponding to the end portions 3' of the drive electrodes 3 the through holes 15 having a diameter of, for example, 0.2 mm are formed.

Conductor paste formed of tungsten or the like is then filled into the through holes 15, and another conductor paste of the same material is printed in a given shape by a screen printing method, with the latter conductor paste being connected to the former conductor paste, thereby forming the drive electrodes 3. These drive electrodes are formed such that they have, for example, a width of 200 μm and a thickness of 20 μm.

After that, on the green sheet with the drive electrodes 3 formed thereon, an insulator, namely, an alumina paste formed of the same material as that of the green sheet forming the insulating base plate 2 and having a controlled viscosity is printed in a given shape by a screen printing method, thereby forming an insulating layer 4 having, for example, a thickness of 30 μm.

Then, in the green sheet that forms the above mentioned insulating layer 4 and insulating base plate 2, at the positions thereof corresponding to the end portions 5' of the control electrodes 5 there are formed through holes 18 having, for example, a diameter of 0.2 mm.

Further, on the alumina paste that forms the insulating layer 4 formed in the above-mentioned manner, conductor paste formed of tungsten or the like are filled into the through holes 18 and another conductor paste of the same material is printed in a given shape by a screen printing method with the latter conductor paste being connected to the former conductor paste filled into the through holes 18, thereby forming the control electrodes 5. Specifically, these control electrodes 5 are formed in such a manner that, for example, each of them has a distance of 200 μm between its space areas 7 and a thickness of 20 μm. Further, the control electrodes 5 are set in such a manner that, after fired, they are spaced about 0.5 mm from each other, for example.

Next, on the green sheet with the above-mentioned control electrodes 5 formed thereon, an alumina paste, which is an insulator formed of the same material as that of the green sheet forming the insulating base plate 2 and having a controlled viscosity, is printed in a given shape by a screen printing method, thereby forming an insulating layer 9 having, for example, a thickness of 20 μm.

Further, on the back surface of the green sheet forming the insulating base plate 2, conductor paste formed of the same material as that of the drive electrodes 3 and control electrodes 5 is printed in a given shape by a screen printing method, thereby forming conductor pads 17 and 20, each preferably having a diameter of 1.5 mm.

Next, the thus constructed multi-layer green sheets are pressed with a given pressure so that the layers can be forcibly attached to one another. Due to this process, the green sheet forming the insulating base plates 2 and the like, and the conductor paste forming the drive electrodes 3 and the like can be integrally connected to one another. At the same time, a pressure is applied so that the conductor pads 17 20, formed on the back surface of the insulating base plate 2, are level with the back surface of the insulating base plate 2, as shown in FIGS. 7 and 8. After that, the multi-layer green sheets are fired at a temperature of 1500°-1600° C. within a reducing atmosphere furnace, so that the insulating base plate 2, drive electrodes 3, insulating layer 4, control electrodes 5, and insulating layer 9 can be integrally formed in a given shape.

During the above process, the green sheets that form the insulating base plate 2 and the like are contracted on the order of 20% when compared with the before-mentioned dimensions thereof, until the green sheets have dimensions as desired.

With the ceramic multi-layer plate fired in the above mentioned manner, and in order to prevent oxidation of the drive electrodes 3 and control electrodes 5, as well as the conductor pads 17 and 20, which are formed of tungsten, the exposed portions of the drive electrodes 3 and control electrodes 5, as well as the conductor pads 17 and 20, may be plated with nickel or the like.

Finally, on the insulating layer 9 of the thus fired alumina ceramic multi-layer plate, a screen electrode 11 is placed at a given position to thereby manufacture the recording head 1. The screen electrode 11 is formed by opening up a plurality of openings 12, each having a diameter of 150 μm in a stainless steel plate having a thickness of, for example, 30 μm by means of photo etching. The screen electrode 11 is mounted through suitable spacer member 35 onto the alumina ceramic multi-layer plate by adhesion or other suitable means in such a manner that the electrode 11 is spaced at a constant distance from the control electrodes 5, as shown in FIG. 4.

The above-mentioned recording head 1 applies a high-frequency, high voltage across the drive electrodes 3 and screen electrode 11 by means of an a.c. power supply 30. At the same time, an ion control voltage is applied to the control electrodes 5 by means of a power supply 31, and a d.c. voltage is applied to the screen electrode 11 by means of a d.c. power supply 32, as shown in FIG. 4. In this way, a creeping corona discharge is created in a space area between the drive electrodes 3 and control electrodes 5, to which the voltages are applied selectively, and ions produced in such creeping corona discharge are accelerated or absorbed by an electric field between the control electrodes 5 and screen electrode 11 to thereby control the discharge of the ions so as to form an electrostatic latent image.

Here, a distance between the screen electrode 11 and dielectric drum 22 is set within the range of 100–400 $\mu$m; but preferably between 200 and 300 $\mu$m.

Referring in summary to the insulating base plate 2 and insulating layer 4, as shown in FIGS. 1, 7 and 8, the through holes 15 and 18 are formed to respectively extend to the back surface of the insulating base plate 2; the conductors 16 and 19 are formed in conduction with the drive electrodes 3 and control electrodes 5 and filled or loaded into the through holes 15 and 18; the conductor pads 17 and 20 are formed in conduction with the conductors 16 and 19, and filled are provided on the back surface of the insulating base plate 2; such that the voltages can be applied through the conductor pads 17 and 20 to the drive electrodes 3 and control electrodes 5. Due to this structure, the conductor pads 17 and 20 enable the application of voltages to the drive electrodes 3 and control electrodes 5 through the back surface of the insulating base plate 2. Since there is typically sufficient space on the back surface of the insulating base plate, this, in turn, permits easy mounting of the contact probes 23 and other parts, as well as easy and positive connection of the high voltage input.

Further, a greater distance can be provided between the respective conductor pads 17 and 20, and also it is possible to prevent the occurrence of leakage, attenuation or abnormal discharge between the respective conductor pads 17, and 20.

Furthermore, given voltages can be applied to the drive electrodes 3 and control electrodes 5 only by contacting the contact probes 23 with the conductor pads 17 and 20, so that the structure of the connection parts can be simplified. In this manner, the need to extensively provide the connecting parts on the side portions of the insulating base plate 2 is eliminated. That is, a compact electrostatic latent image forming device can be realized.

SECOND EMBODIMENT

Figure 11:
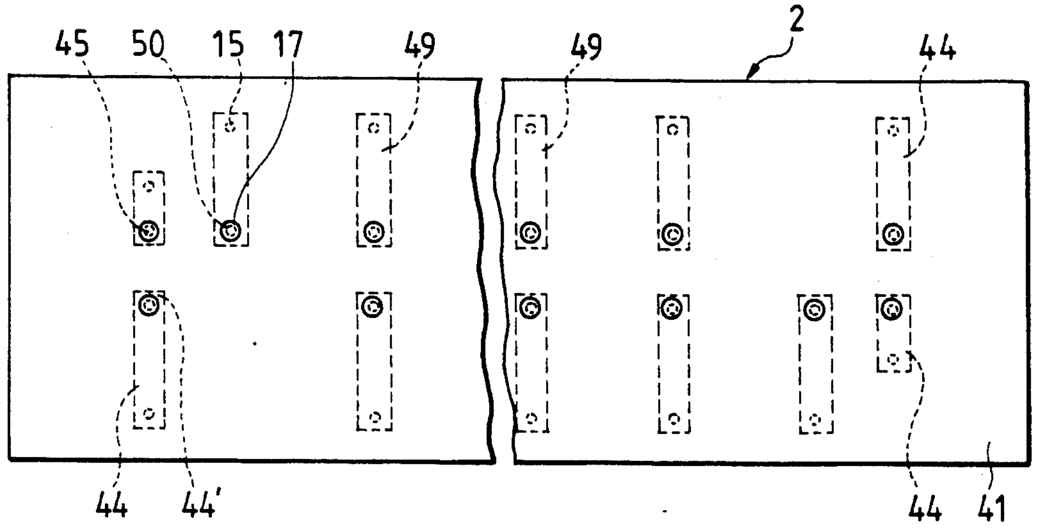
FIG. 11 is a rear view of a second embodiment of the invention.

Referring now to FIG. 11, there is shown a second embodiment of an electrostatic latent image forming device according to the invention, in which the same parts as in the first embodiment described before are designated by the same reference numerals or characters. In the second embodiment, such through holes that extend through an insulating base plate up to the surface thereof are not provided at the positions that correspond to the ends of drive and control electrodes, further, the insulating base plate is constructed in the form of a two-layer structure which is composed of first and second insulating base plates. More specifically, there are formed through holes which respectively extend through the first insulating base plate from the ends of the drive and control electrodes. These are also provided on the surface of the first insulating base plate conduction parts which respectively extend inwardly from the through holes in the first insulating base plate in the width direction, and there are formed through holes which respectively extend through the second insulating base plate up to the surface thereof from the positions corresponding to the leading ends of the conduction parts.

Figure 12:
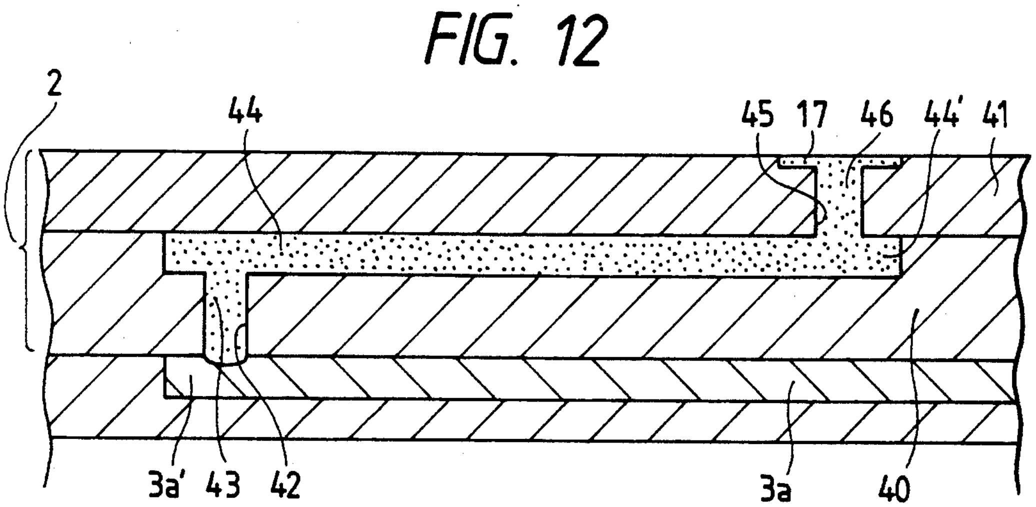
FIG. 12 is a section view of main portions of the second embodiment shown in FIG. 11.
Figure 13:
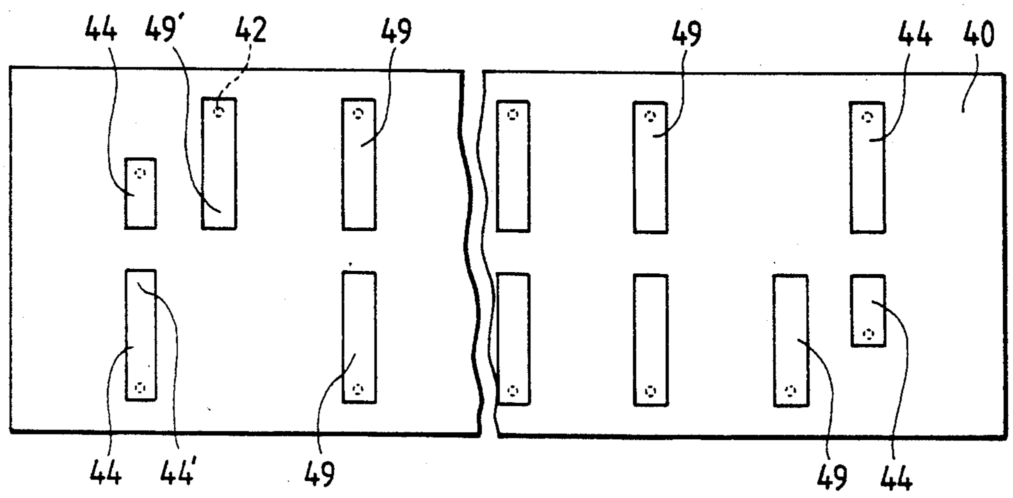
FIG. 13 is a partially cutaway rear view of the second embodiment shown in FIG. 11.

In other words, and as embodied herein, the insulating base plate 2 has a two-layer structure which is composed of a first insulating base plate 40 and a second insulating base plate 41, as shown in FIG. 12. In the first insulating base plate 40, at the positions thereof that correspond to the end portions 3′, of the drive electrodes 3 there are formed through holes 42 in such a manner that they extend only through the first insulating base plate 40. Conductors 43 formed of the same metal material as that of the drive electrodes 3 are filled or loaded into these through holes 42, respectively. Each conductor 43 has one end which is respectively connected to the end portions 3′ of a drive electrode 3 while the other end thereof is respectively connected to a conduction part 44. The conduction parts 44 are provided in a long and narrow strip shape on the back surface of the first insulating base plate 40. The conduction parts 44 are respectively formed in straight lines which extend inwardly in the width direction of the first insulating base plate 40 from the end portions 3′ of the drive electrodes 3. The ends 44′ of the conduction parts 44 are respectively formed in straight lines which extend in the longitudinal direction of the first insulating base plate 40, as shown in FIG. 13.

In the second insulating base plate 41, at the positions thereof that correspond to the ends 44′ of the conduction parts 44 there are formed through holes 45 in such a manner that they extend through the second insulating base plate 41 up to the back surface thereof, as shown in FIG. 12. The through holes 45 are filled with conductors 46 formed of the same metal material as that of the drive electrodes 3. One end of each conductor 46 are respectively connected to the ends end 46′ of a conduction parts 44 while the other end thereof is respectively connected to a connecting part. For example conductor pads 17 are provided in a circular shape on the back surface of the second insulating base plate 41.

Figure 14:
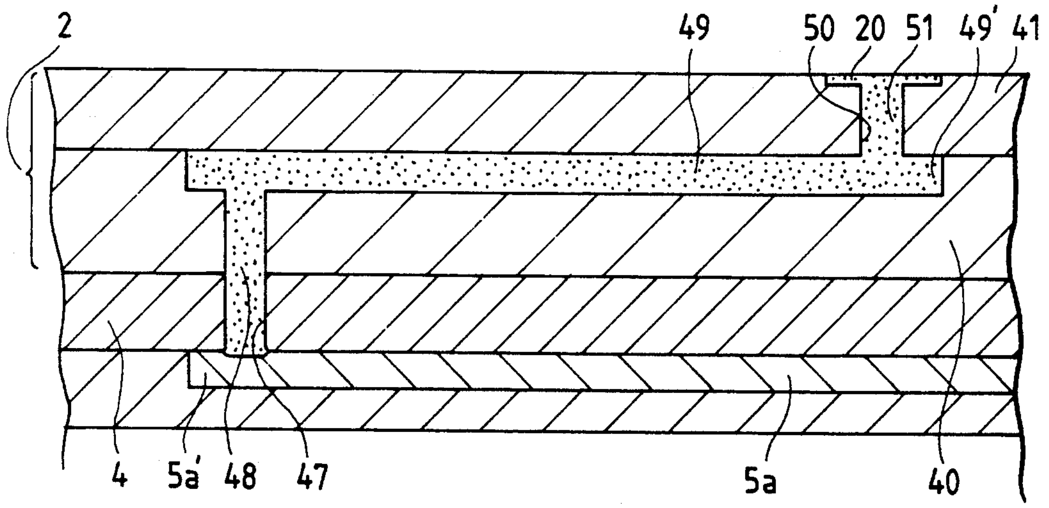
FIG. 14 is a section view of main portions of the second embodiment shown in FIG. 11.

Further, in the first insulating base plate 40 of the insulating base plate 2 and in the insulating layer 4, at the positions thereof that correspond to the end portions 5′ of the control electrodes 5, there are formed through holes 47 in such a manner that they extend through the insulating layer 4 and the first insulating base plate 40 of the insulating base plate 2, as shown in FIG. 14. The through holes 47 are filled with conductors 48 formed of the same metal material as that of the control electrodes 5. One end of each conductor 48 is respectively connected to the end portions 5′ of the control electrodes 5, while the other end thereof is respectively connected to a conduction part 49. The conduction parts 49 are provided in a strip shape on the back surface of the first insulating base plate 40. These conduction parts 49 are arranged so as to extend in straight lines from the end portions 5′ of the control electrodes 5 inwardly in the width direction of the first insulating base plate 40. The ends 49′ of the conduction parts 49 are disposed in straight lines extending in the longitudinal direction of the second insulating base plate 41.

Also, in the second insulating base plate 41, at the positions thereof that correspond to the ends 49′ of the conduction parts 49 there are formed through holes 50 in such a manner that they extend through the second insulating base plate 41 up to the back surface thereof, as shown in FIG. 14. The through holes 50 are filled with conductors 51, 51, formed of the same metal material as that of the drive electrodes 3. One end of each conductors 51 is respectively connected to the end 49′ of a conduction parts 49, while the other end thereof is respectively connected to a connecting part. For example, conductor pads 20 which are provided in a circular shape on the back surface of the second insulating base plate 41.

As has been described above, in the present embodiment, the insulating base plate 2 is constructed in the form of a two-layer structure including the first insulating base plate 40 and the second insulating base plate 41. The conductor pads 17 and 20 are disposed, through the conduction parts 44 and 49, which are provided in the middle portion of the insulating base plate 2, inwardly in the width direction of the insulating base plate. It is understood that the freedom of selection of the positions at which the conductor pads 17 and 20 are provided can be increased, and also the distance between the conductor pads 17 and 20, can be broadened.

Other structures and operations of the second embodiment are the same as those of the first embodiment and thus the description thereof is omitted here.

THIRD EMBODIMENT

Referring now to FIGS. 15 through 19, there is shown a third embodiment of an electrostatic latent image forming device according to the invention, in which the same parts as in the first embodiment are designated by the same reference numerals or characters. As previously noted in the description of the first embodiment, the conductor pads serving as the connecting parts are provided on the back surface of the insulating base plate, and the contact probes are pressed against the surfaces of the conductor pads to thereby supply electricity to the drive electrodes and other components. However, the third embodiment is different from the first embodiment in this respect. That is, according to the structure of the third embodiment, pin grids serving as connecting parts are projectively provided on conductor pads disposed on the back surfaces of the insulating base plate, and the pin grids are then mounted into sockets to thereby supply electricity to the drive electrodes and other components.

Figure 15:
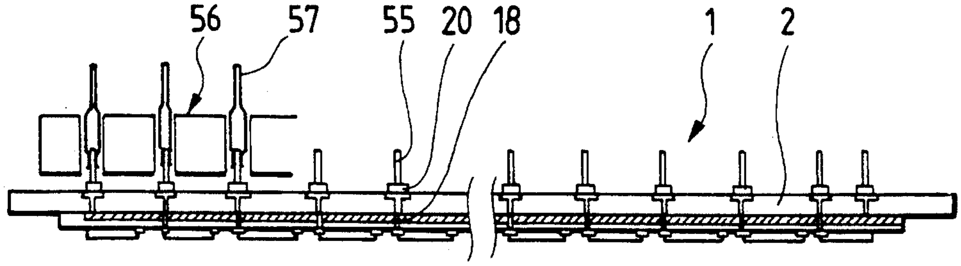
FIG. 15 is a section view of a third embodiment of the invention.
Figure 16:
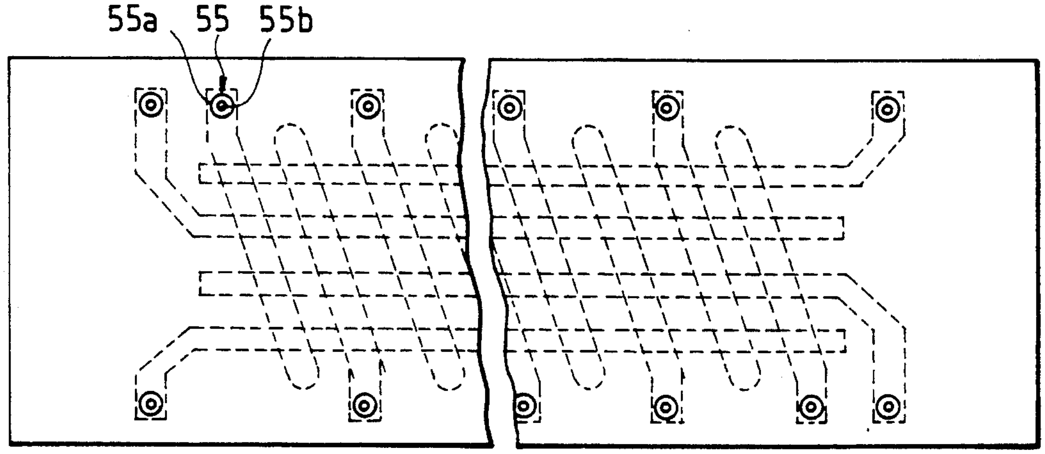
FIG. 16 is a rear view of the third embodiment shown in FIG. 15.
Figure 17:
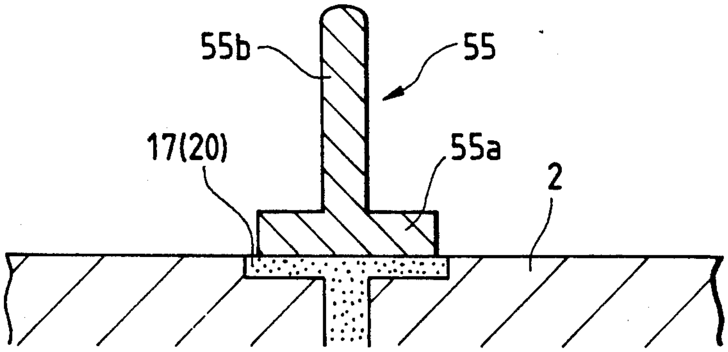
FIG. 17 is a section view of a pin grid.

In other words, and as embodied herein, on the conductor pads 17 and 20, provided on the back surface of the insulating base plate 2, as shown in FIGS. 15 and 17, there are provided pin grids 55 in such a manner that they project from the conductor pads. The pin grids 55 may be formed of copper, iron, nickel alloy, cobalt, or other material. Each pin grid includes a pedestal 55*a* and a pin 55*b* respectively. Each of the pedestals 55*a* is set to have a diameter of, for example 1.2 mm and each of the pins 55*b* is set to have a diameter of, for example, 0.4 mm. The pin grids 55 can be fixed onto the conductor pads 17 and 20 formed on the back surface of the insulating base plate 2, by suitable fixing means such as silver soldering, soldering or the like.

Figure 18:
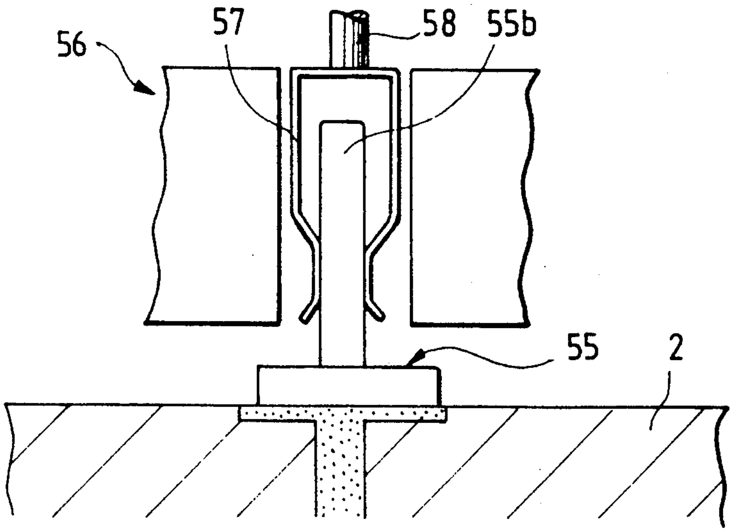
FIG. 18 is a front view representative of the pin grid connection.

Also, the pin grids 55 projectively provided on the back surface of the insulating base plate 2 are held in such a manner that they are grasped by and between electrodes 57 respectively provided in a connector 56, as shown in FIG. 18. A given voltage is applied to the electrodes 57 of the connector 56 respectively through connector pins 58.

For the connector 56, for example, an inexpensive standardized IC socket can be used.

Figure 19:
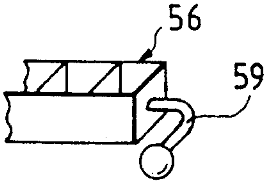
FIG. 19 is a perspective view of another example of a socket.

Alternatively, for the connector 56, as shown in FIG. 19, there may be used a so-called zero-insertion-force type socket which can reduce a mounting/removing force by operating a lever 59. In this case, the recording head 1 can be inserted into and removed from the socket 56 with ease and also, when the recording head 1 is inserted into the socket 56, it is possible to prevent the pin grids 55 of the recording head 1 from being damaged or dropped off by mistake.

In this case, the socket 56 for energizing the recording head 1 is able to supply electricity by grasping the pin grids 55 of the recording head 1. It is not necessary to press the conductor pads 17 and 20 provided on the back surface of the recording head 1. As such, no load is applied to the recording head 1 itself, to allow easy mounting of the recording head 1.

The other structures and operation of this third embodiment are the same as those of the previously described embodiments and thus the description thereof is omitted here.

FOURTH EMBODIMENT

Figure 20:
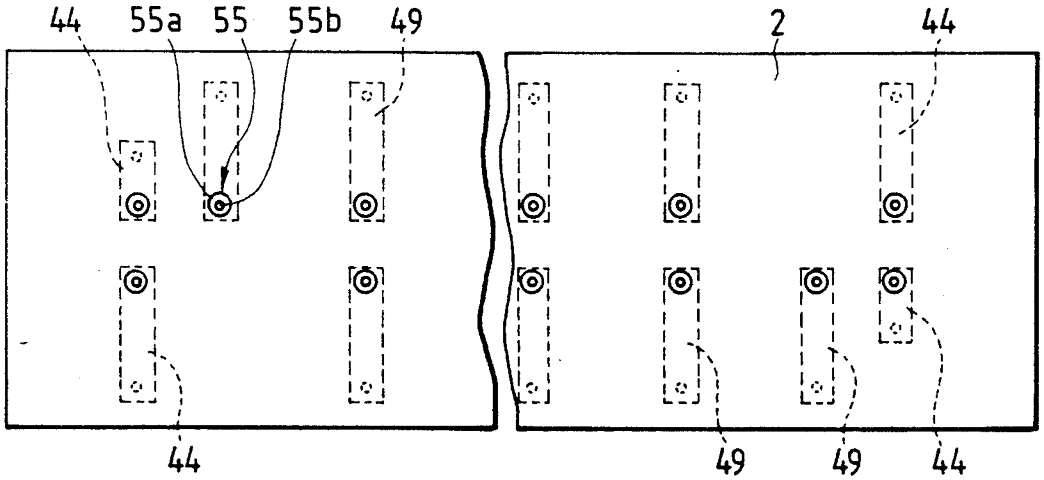
FIG. 20 is a rear view of a fourth embodiment of the invention.

In FIG. 20, there is shown a fourth embodiment of an electrostatic latent image forming device according to the invention, in which the same parts as in the above mentioned second embodiment are designated by the same reference numerals or characters. The fourth embodiment is basically identical in structure with the above-mentioned third embodiment. However, in the fourth embodiment, the through holes extending through the insulating base plate up to the surface thereof are not provided at the positions corresponding to the end portions of the drive and control electrodes. Rather, they are similar to the second embodiment, whereby the insulating base plate is constructed in the form of a two-layer structure including first and second insulating base plates. That is, there are formed through holes which respectively extend through the first insulating base plate from the end portions of the drive and control electrodes, there are formed on the surface of the first insulating base plate conduction parts which extend inwardly in the width direction thereof, and there are formed through holes which respectively extend through the second insulating base plate up to the surface thereof from the positions corresponding to the leading ends of the conduction parts.

The detailed structure and operations of the fourth embodiment are similar to those of the above-mentioned second embodiment and thus the description thereof is omitted here.

FIFTH EMBODIMENT

Figure 21:
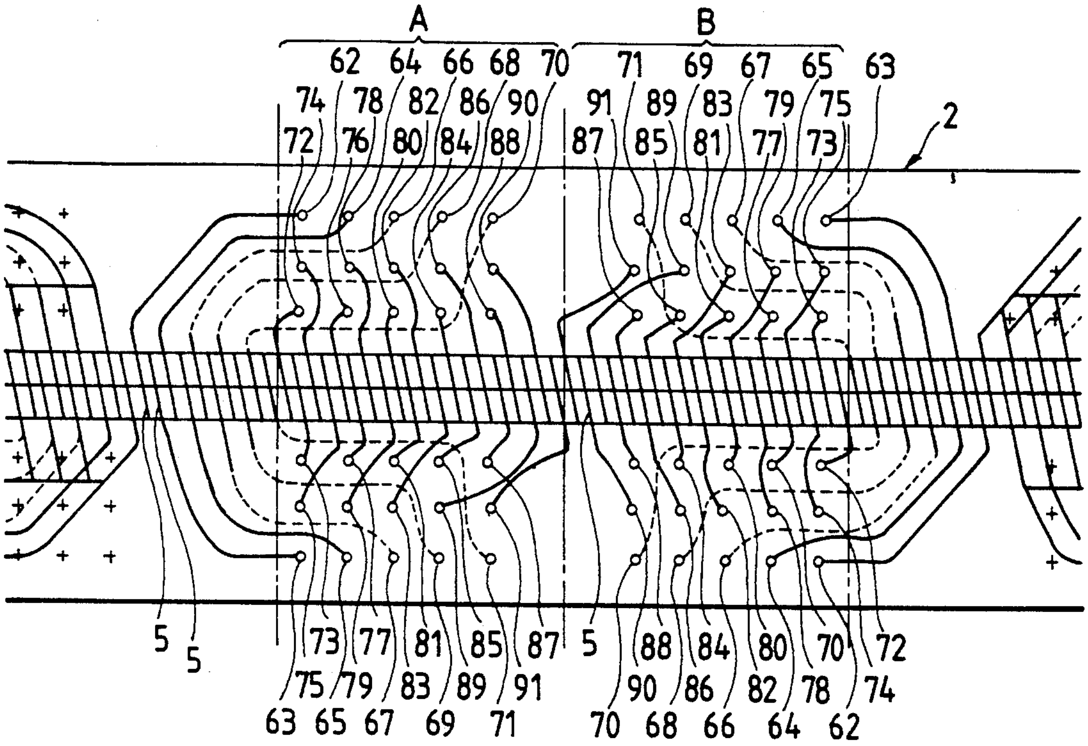
FIG. 21 is an explanatory view of a fifth embodiment of the invention.

In FIG. 21, there is shown a fifth embodiment of an electrostatic latent image forming device according to the invention, in which the same parts as in the above mentioned first embodiment are designated by the same reference numerals or characters. In the fifth embodiment, the control electrodes are arranged densely in the longitudinal direction of the insulating base plate. In particular, the end portions of the control electrodes are not arranged simply in the width direction of the insulating base plate, but the insulating layer that is interposed between the drive and control electrodes is constructed in the form of a two-layer structure including first and second insulating layer, and the end portions of the respective control electrodes are disposed on the surfaces of the first and second insulating layers in such a manner that they are drawn around and they do not interfere with each other.

Figure 22:
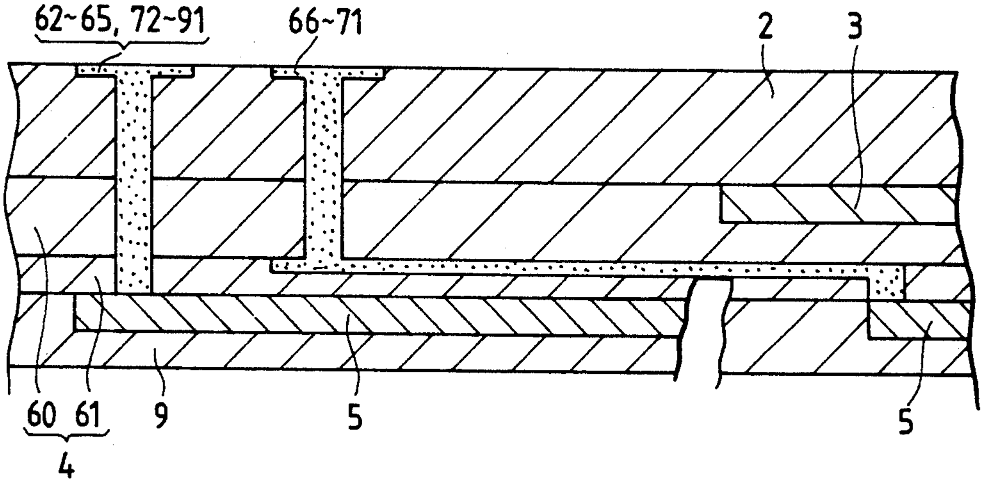
FIG. 22 is a section view of main portions of the fifth embodiment shown in FIG. 21.
Figure 23:
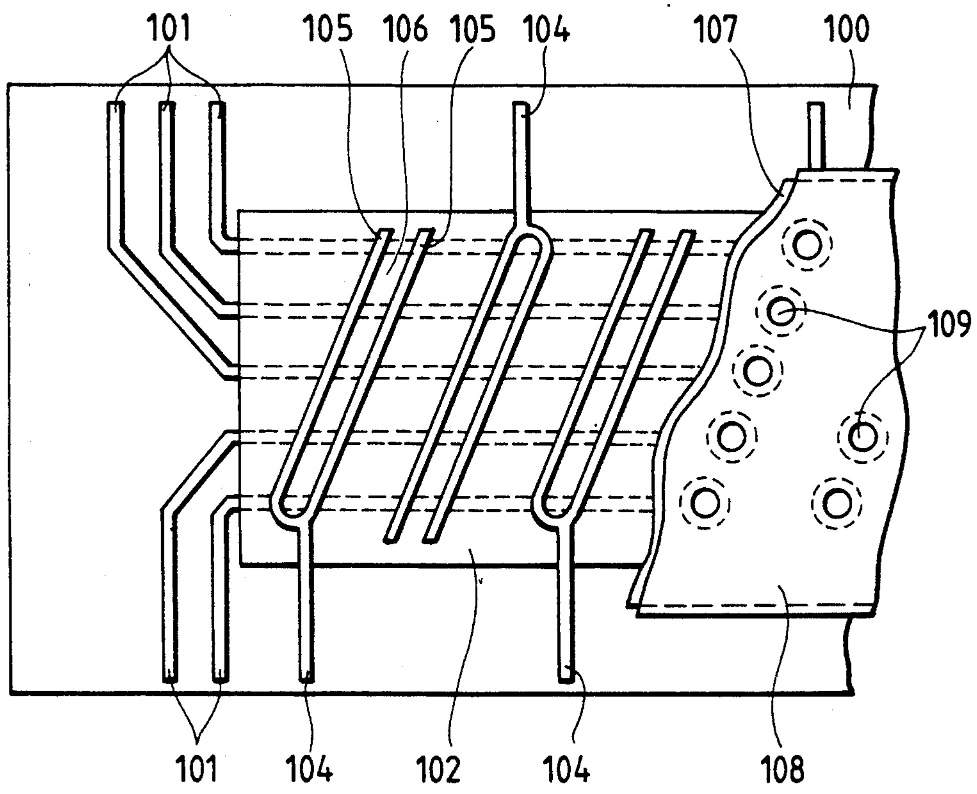
FIG. 23 PRIOR ART
FIG. 23 is a partially cutaway front view of a conventional electrostatic latent image forming device.
Figure 24:
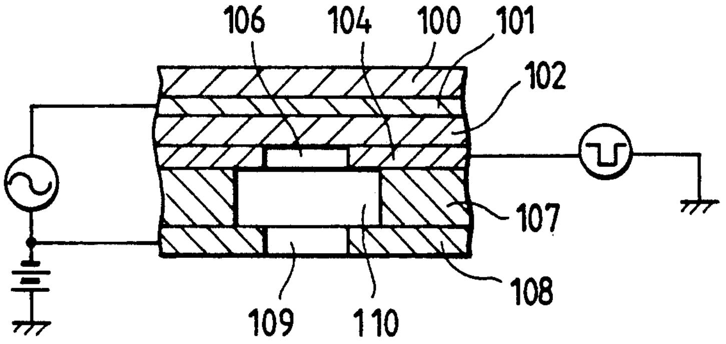
FIG. 24 PRIOR ART
FIG. 24 is a section view of the conventional electrostatic latent image forming device shown in FIG. 23; and, FIGS. 25 and 26 are respectively explanatory views to show how the conventional electrostatic latent image forming device is mounted.
Figure 25:
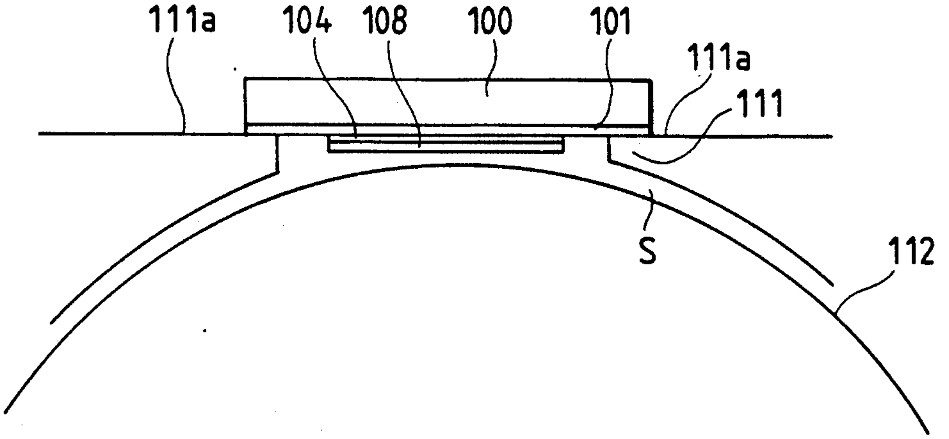
FIG. 25 PRIOR ART
Figure 26:
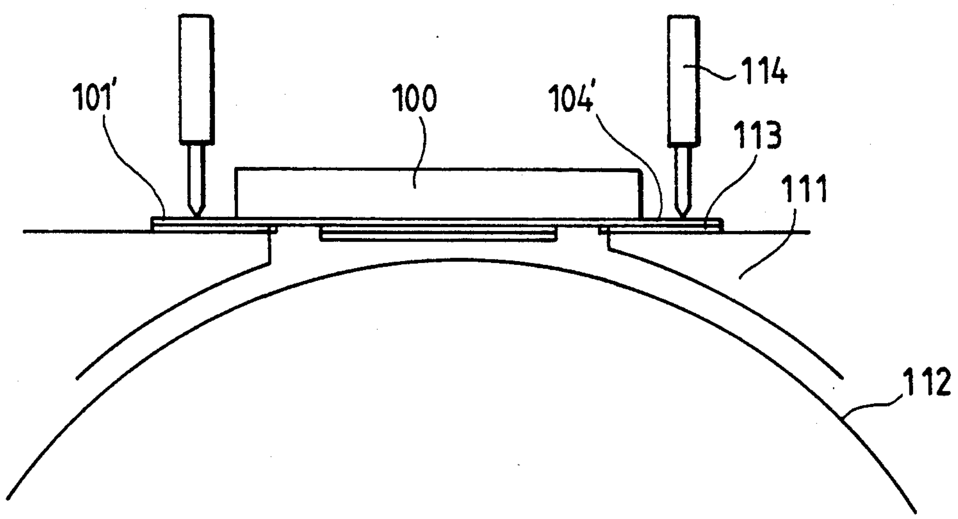
FIG. 26 PRIOR ART

In other words, and as embodied herein, the insulating layer 4, on which the control electrodes 5 are provided is constructed in the form of a two-layer structure including first and second insulating layers 60 and 61, as shown in FIG. 22. Referring to the end portions of the control electrodes 5, the end portions 62–65 and 72–91, respectively extended by solid lines in FIG. 21, are formed on the surface of the first insulating layer 60, while only the end portions 66–71 respectively extended by broken lines in FIG. 21 are formed on the surface of the second insulating layer 61.

As described above, the insulating layer 4 interposed between the drive electrodes 3 and the control electrodes has a two-layer structure, and the end portions 62–65, 72–91, and 66–71 of the control electrodes 5 are disposed on the surface of the first insulating layer 60 and on the surface of the second insulating layer 61 in such a manner that they are drawn around each other so as not to interfere with each other, even when the control electrodes 5 are arranged densely in the longitudinal direction of the insulating base plate 2. As such, it is possible to prevent the end portions 62–65, 72–91, and 66–71 of the control electrodes 5 from interfering with each other and also to prevent occurrence of leakage or the like in the feeder terminal and other similar components.

The control electrodes 5 are divided into two groups, namely, A and B groups. The A group includes the control electrodes respectively having the end portions 62 to 91. The control electrodes belonging to the B group, which adjoins the A group, as shown by the same reference numerals in FIG. 21, are drawn around in such a manner that the end portions 62 to 91 are disposed upside down with respect to the A group control electrodes 5 respectively having the end portions 62 to 91.

The other structures and operations of the fifth embodiment are the same as those of the previously described embodiments and thus the description thereof is omitted here.

Due to the fact that the present invention provides the above-mentioned structures and operations, according to the invention, it is possible to provide an electrostatic latent image forming device which allows easy formation of a feeder terminal and the like for applying voltages to electrodes, and allows easy and positive connection of a high voltage input. Further, the electrostatic latent image forming device can prevent occurrence of leakage, attenuation or abnormal discharge in the feeder terminal and the like, and can provide a simple and compact structure.

What is claimed is:

1. An electrostatic latent image forming device comprising a first insulating base plate having a front surface and a back surface; a second insulating base plate overlying the front surface; a plurality of first electrodes disposed between said first insulating base plate and said second insulating base plate; a plurality of second electrodes disposed on said second insulating base plate, wherein said first electrodes and said second electrodes generally form a matrix with said second insulating base plate interposed therebetween, and each of said second electrodes includes a space area where a creeping corona discharge is caused to occur by applying a voltage across said first electrodes and said second electrodes;

said first insulating base plate having through holes formed therein, said through holes formed in said first insulating base plate communicating with said first electrodes and said second electrodes, respectively, and extending through said first insulating base plate to the back surface thereof;

conductors comprising conductive material filled into said through holes formed in said first insulating base plate, said conductors being in conduction with said first electrodes and said second electrodes, respectively; and connecting parts provided on the back surface of said first insulating base plate, said connecting parts being in conduction with said conductors to permit voltages to be applied to each of said first electrodes and said second electrodes, respectively, through said connecting parts.

2. The electrostatic latent image forming device of claim 1, wherein said second insulating base plate includes through holes communicating with said second electrodes formed therein, and said through holes formed in said second insulating base plate are filled with conductive material in conduction with said second electrodes.

3. The electrostatic latent image forming device of claim 1, wherein said first insulating base plate has a two-layer structure comprising a first insulating layer and a second insulating layer; and further wherein said through holes formed in said first insulating base plate are defined by said first insulating layer including first through hole portions extending from said first electrodes and said second electrodes, respectively, to a surface of said first insulating layer adjacent said second insulating layer, and said second insulating layer including second through hole portions extending from the back surface of said first insulating base plate to a surface of said second insulating layer adjacent said first insulating layer; and said conductors further comprising conduction parts provided between said first insulating layer and said second insulating layer, said conductive material filled in said first through hole portions and said second through hole portions and being connected to each other through said conduction parts provided between said first insulating layer and said second insulating layer.

4. The electrostatic latent image forming device of claim 2, wherein said second insulating base plate has a two-layer structure comprising a first insulating layer and a second insulating layer; and further wherein said through holes formed in said second insulating base plate are defined by said first insulating layer including first through hole portions extending from said second electrodes to a surface of said first insulating layer adjacent said second insulating layer, and said second insulating layer including second through hole portions communicating with and extending from said through holes formed in said first insulating base plate to a surface of said second insulating layer adjacent said first insulating layer; and said first through hole portions and said second through hole portions are filled with conductive material, and said conductive material in said first through hole portions and said second through hole portions are connected to each other by conduction parts provided between said first insulating layer and said second insulating layer.

5. The electrostatic latent image forming device of claim 1, wherein said connecting parts include flat-shaped electrodes.

6. The electrostatic latent image forming device of claim 1, wherein said connecting parts include pin-shaped electrodes.

7. The electrostatic latent image forming device of claim 1, wherein said first insulating base plate and said second insulating base plate are formed of a ceramic material.

8. The electrostatic latent image forming device of claim 1, wherein said first electrodes and said second electrodes are formed of a sintered metal conductor material.

* * * * *